Aug. 29, 1944.   B. E. O'CONNOR   2,357,278
HYDRAULIC DAMPER
Filed Sept. 21, 1942   2 Sheets-Sheet 2
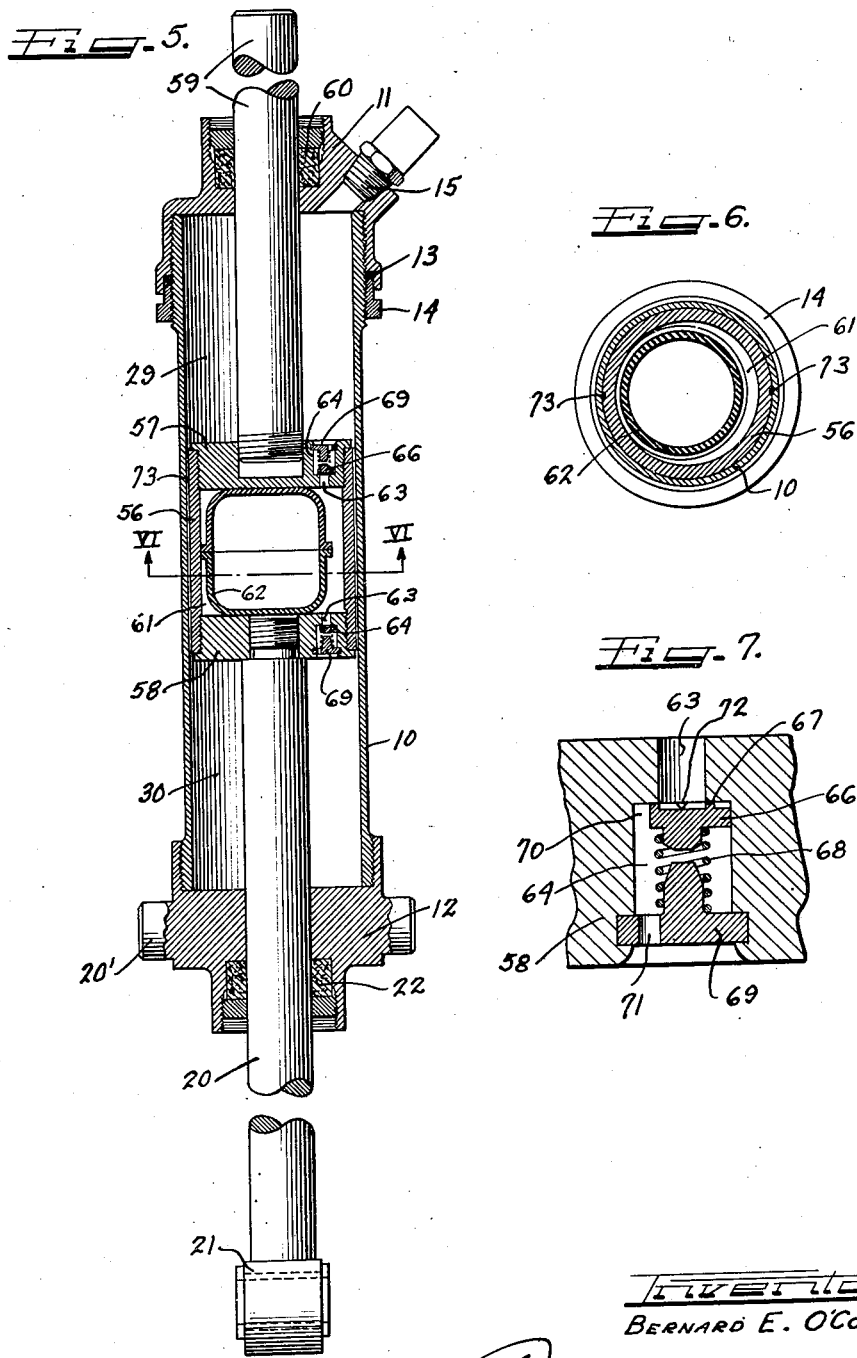
Inventor
BERNARD E. O'CONNOR.

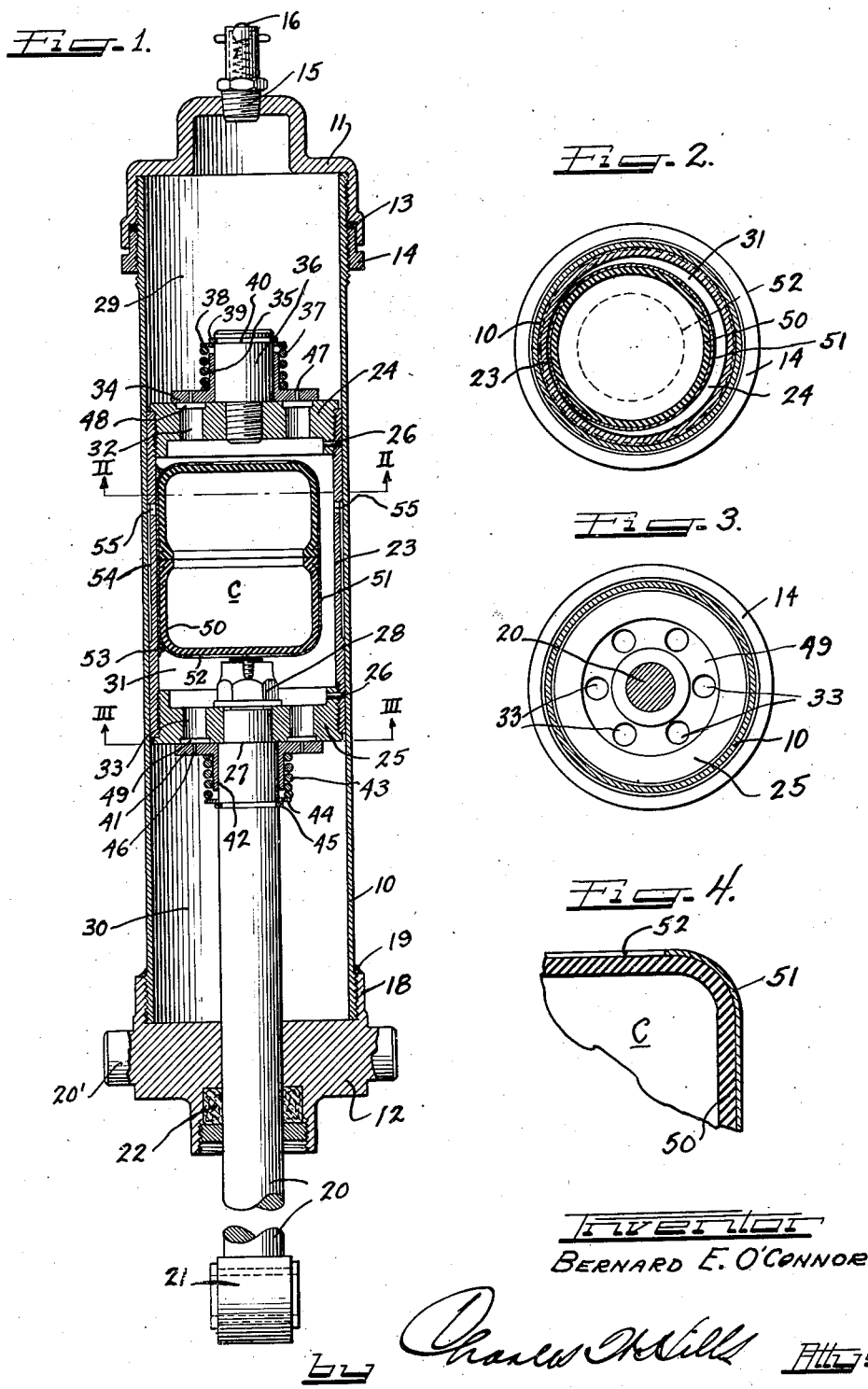

Patented Aug. 29, 1944

2,357,278

UNITED STATES PATENT OFFICE 2,357,278

HYDRAULIC DAMPER

Bernard E. O'Connor, Buffalo, N. Y., assignor to Houdaille-Hershey Corporation, Detroit, Mich., a corporation of Michigan Application September 21, 1942, Serial No. 459,100

2 Claims. (Cl. 188—96)

This invention relates to hydraulic dampers, particularly to the direct acting type in which a cylinder structure and a piston structure are relatively reciprocable longitudinally for displacement of fluid against flow resistance, my improved structure being adapted for general use but being of particular utility on airplanes in connection with the nose or tail wheel on the landing gear to dampen the wheel movement and to prevent shimmying.

For proper and efficient operation of hydraulic dampers of the type referred to, the cylinder must at all times and under all temperature conditions be completely filled with hydraulic fluid to the exclusion of entrance of air which would aerate the hydraulic fluid and interfere with proper functioning of the damper. Also in hydraulic dampers where the piston rod extends from only one end of the piston to the exterior of the cylinder, adequate provision must be made for compensating for the displacement of the hydraulic fluid in the cylinder by the volume of the piston rod as it enters or leaves the cylinder.

The object of my invention is therefore to produce a simple, compact and efficient hydraulic damper which will prevent aerating of the hydraulic fluid and which will compensate for the variation in volume of the fluid due to temperature changes and the movement of the piston rod in the cylinder.

An important feature of the invention is the provision of a compensating chamber connected with the cylinder working chambers under valve control and containing a compensating element expansible and contractible to function to keep the cylinder at all times filled with hydraulic fluid.

Another feature is to locate the compensating chamber within the piston with the compensating element therein, and with valving arrangement on the piston for controlling the flow of the displaced fluid into and out of the compensating chamber.

Another feature of the invention is to provide a compensating element in the form of a closed container of elastic and flexible material such as rubber, or material having the characteristics of rubber, and with the container filled with elastic medium such as air.

Another feature is the provision of means for charging hydraulic fluid into the cylinder when the piston is at the extreme end of its outward movement and under sufficient pressure to reduce the volume of the compensator element an amount equal to the reduction in volume of fluid under the maximum temperature differential anticipated, so that, under temperature variation and increase or decrease of the fluid volume in the cylinder, the compensator may contract or expand correspondingly to effect compensation and keep the cylinder fully filled.

The various features of my invention are embodied in the structure shown in the drawings, in which Figure 1 is a longitudinal diametrical section of a damper structure;

Figure 2 is a section on plane II—II of Figure 1;

Figure 3 is a section on plane III—III of Figure 1;

Figure 4 is an enlarged section of a portion of the compensator element;

Figure 5 is a longitudinal diametrical section of a modified damper structure;

Figure 6 is a section on plane VI—VI of Figure 5; and Figure 7 is an enlarged section of a portion of the piston and one of the valve structures thereon.

Referring to Figures 1 to 4, the damper as shown comprises the tubular cylinder wall 10 closed at its ends by upper and lower caps or heads 11 and 12 respectively. As shown, the head 11 is threaded to the end of the cylinder and is flanged at its inner end to receive suitable packing 13 under pressure of a gland nut 14 threading on the cylinder, to thus form a sealed joint between the head and cylinder. A filler plug 15 is provided for the head 11 and contains a check valve 16 which permits charging of hydraulic fluid into the cylinder but prevents outflow of the fluid.

The lower head 12 may be secured to the cylinder 10 by a flange 18 threading onto the cylinder, and sealing material such as solder 19 may be applied to effect a tight joint. The head 12 is shown provided with trunnions 20' by which the cylinder may be attached to a support, as for example, the non-rotating member of a castering structure. Extending through the head 12 is the piston rod 20 which at its outer end carries the head or fitting 21 by which the rod may be secured to follow the movement of the structure to be controlled, as for example the rotating member of the castering structure which carries the nose or tail wheel. Suitable packing 22 is provided in the head 12 to prevent leakage of hydraulic fluid from the cylinder.

The piston structure comprises the cylindrical or tubular wall 23 engaging the inner side of the cylinder wall 10, and the inner and outer heads 24 and 25, the heads being shown as secured by threading into the ends of the wall 23 and locked by pins 26. At its inner end the piston rod 20 receives the outer piston head 25 which is securely clamped against the piston rod shoulder 27 by the nut 28 threading onto the piston rod end.

The ends of the cylinder 10 at opposite sides of the piston constitute hydraulic working chambers 29 and 30. The piston wall 23 and the heads 24—25 define a compensating chamber 31, this compensating chamber being connectible with the working chamber 29 through passageways 32 in the head 24, and connectible with the working chamber 30 through passageways 33 in the head 25. Flow through the passageways 32 is controlled by a valve 34, shown in the form of an annular plate, for seating against the outer face of the piston head 24, an annular guide flange 35 on the plate receiving the guide stud 36 on the head 24, a spring 37 being interposed between the plate and an abutment washer 38 held in place by a snap ring 39 in the groove 40 in the end of the guide stud, the spring tending to hold the valve plate against the head to cover the passageways 32 therethrough.

Flow through the passageways 33 in the piston head 25 is controlled by the valve plate 41 having the guide flange 42 receiving the piston rod 20, the spring 43 tending to hold the valve plate seated against the outer face of the piston head to cover the passageways 33, the washer 44 held by a snap ring 45 forming the outer abutment for the spring. The valve plate 41 has one or more flow restricting orifices 46 therethrough, and the valve plate 34 has one or more flow restricting orifices 47 therethrough. The piston head 24 has the annular channel 48 in which the outer ends of the passageways 32 terminate, and the piston head 25 has a similar channel 49 with which the passageways 33 communicate. The orifices in the valve plates communicate with the respective channels, the valves being normally held by their springs to cover the outer ends of the channels.

Within the compensating chamber 31 there is provided the compensator element C. This element may be of any shape, and as shown, it is cylindrical and comprises the container 50 of flexible, elastic material such as rubber or material having the characteristics of rubber, this container being filled with some elastic medium such as air. The container is housed in a sheet metal shell 51 which has the openings 52 in its end walls for access of the hydraulic fluid to the container. The compensator is preferably secured to the piston wall 23 as by soldering of the housing 51 thereto as indicated at 53.

To condition the structure for service, the cylinder, after setting of the piston at the lower end thereof, is filled with hydraulic fluid through the filler plug 15 and under sufficient pressure to contract and reduce the volume of the compensator to an amount equal to or somewhat greater than the reduction in volume of the fluid in the cylinder under maximum anticipated temperature differential. When the damper is in service, increase in volume of the hydraulic fluid in the cylinder under temperature increase will exert pressure against the compensator for further contraction thereof and compression of the air therein, and as the temperature decreases with resulting decrease in volume of the hydraulic fluid, the compressed air in the compensator will expand the compensator for compensation of the decreasing fluid volume so that at all times and under all temperature conditions the cylinder will be kept completely filled with hydraulic fluid.

Upon inward movement of the piston and piston rod in the cylinder, the fluid in the working chamber 29 will be put under pressure and forced through the orifices 47 and the piston head passageways 32 into the compensating chamber 31, and if the speed of travel of the piston is comparatively slow, the orifices 46 in the valve plate 41 will take care of the flow from the chamber 31 into the working chamber 30. Under rapid travel of the piston, if the orifices 46 are unable to take the flow, the valve plate 41 will be unseated for freer flow through the passageways 33 in the piston head 25.

As the piston rod 20 enters the cylinder, the fluid capacity of the cylinder will decrease by the volume of the piston rod which enters the cylinder. The fluid displacement in the chamber 30 by the piston will prevent the full volume of fluid displaced from chamber 29 by the piston from entering chamber 30 and the difference is compensated for by the compression and contraction of the compensating element C.

When the piston moves outwardly, the fluid in the working chamber 30 will be under pressure and will flow through the orifices 46 into the compensator chamber 31 and through the orifices 47 in the valve 34 into the working chamber 29 when the piston movement is slow, greater speed causing the valve 34 to be unseated for corresponding freer flow through the passageways 32. As the piston moves outwardly, the cylinder volume increases as the piston rod is being withdrawn and the compressed air in the compensator will expand the compensator to compensate for the increasing volume capacity of the cylinder. The functioning of the compensator thus at all times keeps the working chambers 29 and 30 and the compensator chamber 31 completely filled with fluid so that the damper may function efficiently and properly under all conditions.

To provide lubrication for the piston, the piston wall 23, intermediate its ends, has the shallow circumferentially extending groove 54 connected with the chamber 31 by holes 55 in the piston wall.

In the modified arrangement shown on Figures 5 to 7, the cylinder structure is substantially the same as that on Figure 1, the cylinder wall 10 having the upper and lower heads 11 and 12 secured thereto and with the head 11 provided with a filler plug 15.

The piston comprises the cylindrical wall 56 and the inner and outer end walls or heads 57 and 58. The piston rod 20 is secured at its inner end to the piston head 58 and at its outer end has the fitting 21 for connection with a structure to be controlled.

A dummy piston rod 59, of the same diameter as the piston rod 20, is secured to the piston head 57 and extends outwardly through the cylinder head 11 and is surrounded by sealing packing 60. With this dummy piston rod, movement of the piston and rods will not change the cylinder fluid volume capacity. Within the piston is the compensator chamber 61 for the compensator 62 in the form of a flexible container of rubber or analogous material and filled with elastic medium such as air. The cylinder is filled with hydraulic fluid through the plug 15 at proper pressure, as explained in connection with the compensator of Figure 1, so that the compensator will function to keep the cylinder at all times entirely filled with hydraulic fluid.

Each piston head has a passageway 63 therein connecting the compensating chamber 61 with the valve chambers 64 in the outer part of the head. In each valve chamber is a valve 66 controlling the passageway 63, the valve having a circular seating flange 67 for seating against the bottom of the valve chamber to close the passageway 63, a spring 68 being interposed between the valve and a retainer 69 seated in the outer end of the valve chambers. Outside of its circular seating flange 67 each valve has one or more passageways 70 therethrough and each retainer 69 has one or more passageways 71 therethrough. The flange on each valve has one or more restricted flow notches or vents 72 therein through which fluid may flow while the valve is held against its seat by the spring 68. These check valves permit free flow of fluid from the compensator chamber 61 to the cylinder working chambers 29 and 30 but prevent the flow from the working chambers into the compensating chamber except for the restricted flow through the restricted vents 72 in the valves.

The direct flow of displaced fluid from one of the cylinder working chambers to the other during operation of the piston is controlled by metering slots 73 in the outer side of the piston wall 56, and most of the displaced fluid will flow through these metering slots which are restricted to provide the desired flow resistance. A very small portion of the displaced flow will be through the restricted vent 72 of the corresponding check valve. Suppose that the piston is moving inwardly, the fluid displaced from the working chamber 29 will flow through the metering slots 73 to the working chamber 30, and a small volume of flow will be from the chamber 29 into the compensating chamber 61 through the vent 72 in the check valve 66 in the piston head 57, the outflow from the chamber 61 to working chamber 30 being through the vent 72 of the check valve in the piston head 58 if the piston movement is comparatively slow, and if the piston movement is more rapid the check valve in the piston head 58 will be unseated for corresponding rapid flow from the chamber 61 into the working chamber 30. In the movement of the piston in the opposite direction, the flow will be in the same manner, the outflow from the compensating chamber 61 being through the check valve in the piston head 57 into working chamber 29.

When the damper is in service, the fluid flow through the compensating chamber 61 will subject the compensator 62 to the varying temperature of the fluid. During increase in temperature and resultant increase in the volume of the fluid in the cylinder, the compensator will be correspondingly contracted and the air therein compressed so that, when the temperature decreases, the compensator will correspondingly expand and force fluid from the compensating chamber past the check valves 66 into the working chambers 29 and 30 to keep them and the entire cylinder always filled with fluid so that the damper may function correctly and efficiently under all conditions. By locating the compensating chamber within the piston, a very compact structure results which can be economically manufactured.

I have shown practical and efficient embodiments of the various features of my invention, but I do not desire to be limited to the exact construction, arrangement and operation shown and described, as changes and modifications may be made without departing from the scope of the invention.

I claim as my invention:

1. A hydraulic damper of the type described comprising a cylinder, a piston movable in said cylinder and having a rod extending therefrom to the exterior of the cylinder, means controlling the resistance to the flow of displaced fluid in the cylinder from one side of the piston to the other during reciprocation of the piston in the cylinder, said piston having a compensating chamber therein for flow of displaced hydraulic fluid therethrough, a compensating element within said piston chamber of flexible and elastic material, said cylinder being closed and primarily filled with hydraulic fluid under sufficient pressure for contraction and reduction in volume of said compensating element to an amount greater than the reduction in volume of the fluid under maximum anticipated temperature differential, said compensating element upon movement of the piston rod into the cylinder being further contracted and expanding during outward movement of the piston rod whereby to keep the cylinder fully filled with hydraulic fluid.

2. A hydraulic damper of the type referred to comprising a cylinder, a piston movable in said cylinder and having a chamber therein, means controlling the flow of displaced fluid from one side of the piston to the other side thereof and through said piston chamber when said piston is moved in said cylinder, a volume compensating element within said piston chamber in the form of a closed container of flexible elastic material such as rubber and filled with some elastic medium such as air, said cylinder and said piston chamber being filled with hydraulic fluid under pressure materially greater than atmospheric pressure, said compensating element functioning to contract or expand in accordance with temperature change of the hydraulic fluid and consequent change in volume of the fluid to keep the cylinder filled with the hydraulic fluid regardless of temperature changes, and a sheet metal retaining shell for said compensating element secured to the piston.

BERNARD E. O'CONNOR.